United States Patent Office 3,225,295
Patented Dec. 21, 1965

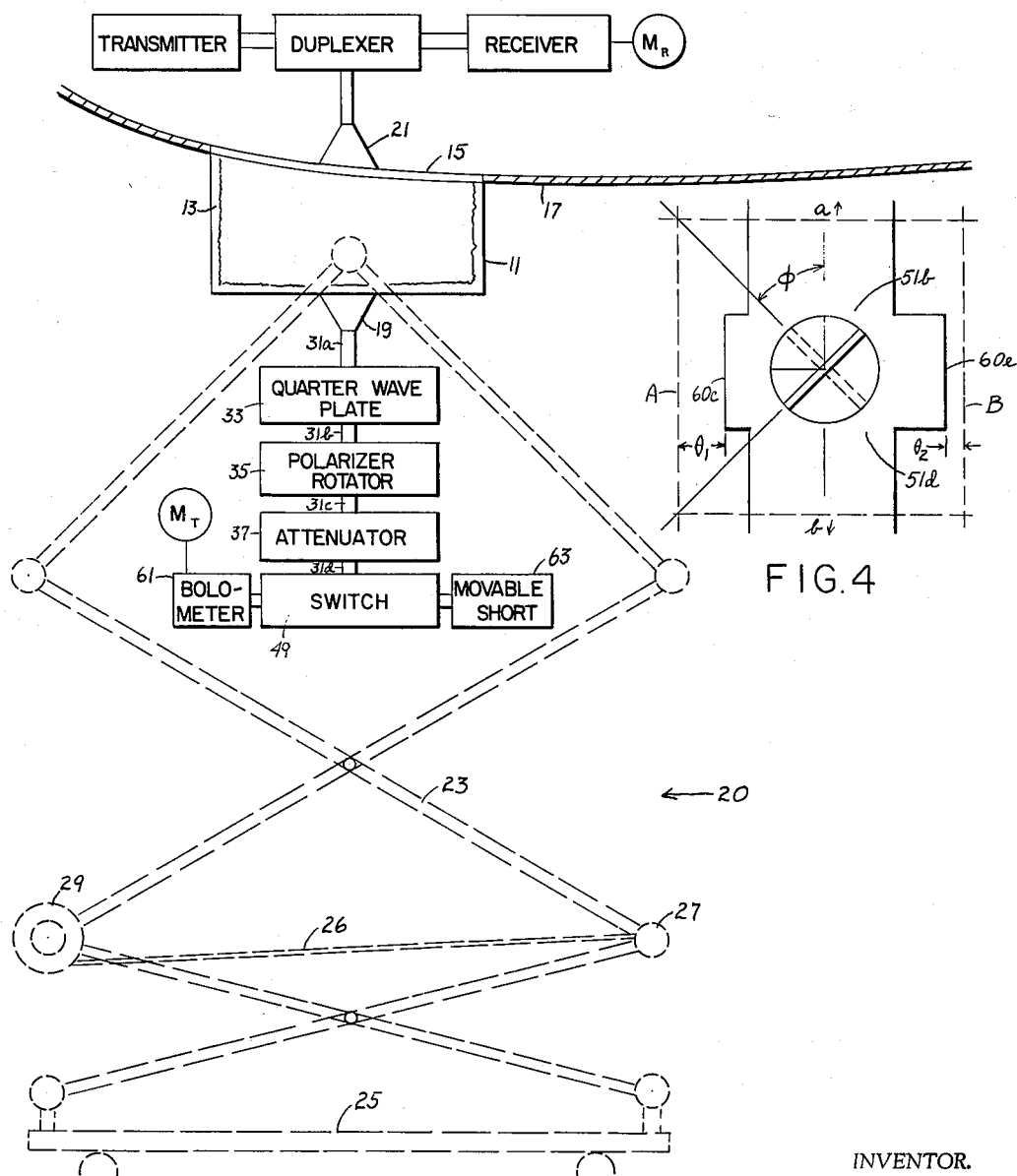

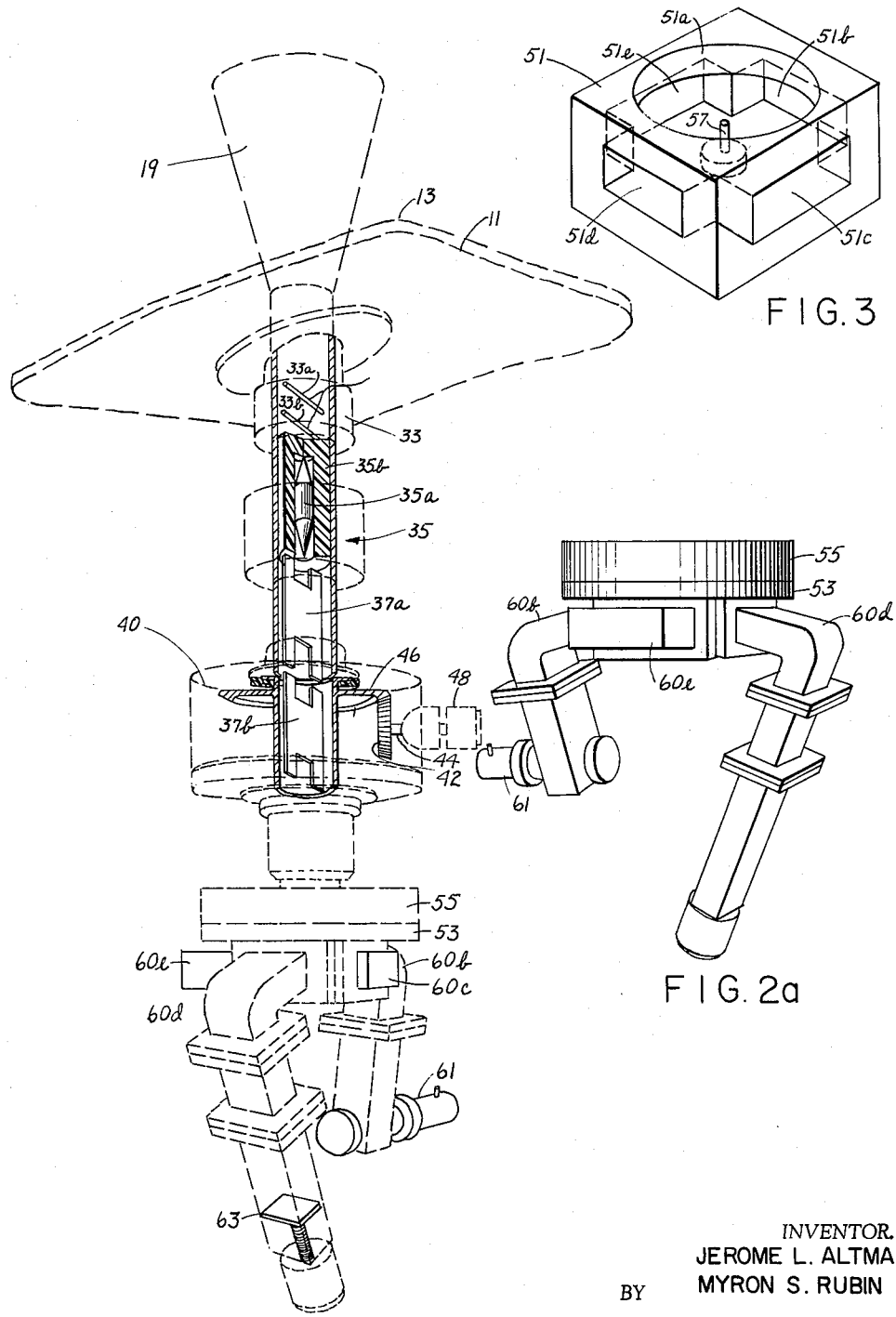

3,225,295
UNITARY MICROWAVE TESTER FOR TRANSMIT-RECEIVE SYSTEMS INCLUDING POWER MEASURING AND REFLECTIVE MEANS
Jerome L. Altman, Waban, and Myron S. Rubin, Framingham Center, Mass., assignors to Laboratory for Electronics, Inc., Boston, Mass., a corporation of Delaware
Filed Sept. 1, 1961, Ser. No. 135,482
6 Claims. (Cl. 324—58)

This invention pertains generally to apparatus for testing microwave transmitters and receivers and particularly to improved apparatus by means of which either the power output of a microwave transmitter or the sensitivity of a microwave receiver may be easily tested under field conditions.

It has always been a difficult problem accurately to simulate operating conditions of airborne microwave equipment in order to ground-test such equipment immediately before it is actually used in flight. Stray reflections of an unpredictable nature must either be eliminated or compensated if satisfactory results are to be obtained. The problem is particularly difficult when it is required to test microwave equipment which radiates circularly polarized waves.

No known microwave testing apparatus has been capable of providing, in a unitary structure, means for successively testing the power output of a microwave transmitter which propagates circularly polarized radiation and the sensitivity of an associated receiver.

Therefore, it is a primary object of the invention to provide microwave testing apparatus which is adapted to receive a circularly polarized wave and, either:

(a) Convert such circularly polarized wave to a plane polarized wave, attenuate such a plane polarized wave, and reform a circularly polarized wave from the attenuated plane polarized wave to produce finally a standard signal for the microwave receiver under test; or, (b) pass a predetermined portion of the original circularly polarized radiation directly to a power measuring device to measure the power of the transmitter from which the circularly polarized radiation originated.

A more general object of the invention to provide microwave testing equipment for testing the overall efficiency of a microwave transmitter-receiver combination in actual operation, the testing equipment not being mechanically coupled into any microwave transmission lines associated either with the transmitter or receiver being tested.

Still another object of the invention is to provide microwave testing equipment which is adapted to produce a standard signal for a microwave received in the presence of stray reflected signals of an unpredictable nature.

Still another object of the invention is to provide improved microwave testing equipment for successively testing a microwave transmitter and its associated receiver, which equipment is contained in a unitary structure and may be easily switched from one mode of operation to the other.

These and other objects of the invention are attained generally by the combination of: an anechoic chamber (meaning an enclosure having walls which absorb substantially all of the microwave energy impinging thereon) disposed in the field of the microwave system being tested; test antenna means opening into the anechoic chamber to receive a portion of the microwave energy directly from the antenna of the system being tested; microwave transmission means having its first end connected to the test antenna and its second end connected to a matched microwave switch having (1) a first set position wherein all the energy in the microwave transmission means is directed to a non-reflecting termination, and (2) a second set position wherein all the energy in the microwave transmission means is directed to a totally reflecting termination and redirected back through the microwave transmission means to be radiated back to the system antenna; and means for adjusting the amount the finally radiated energy is attenuated. Thus, when the microwave switch is in its first set position both the energy transmitted by the system antenna may be measured by measuring the amount of energy absorbed by the reflectionless termination and, in addition, when the microwave switch is in its second set position the energy finally radiated by the test antenna may be varied so as to combine with any reflected energy reaching the system antenna to provide there a standard signal.

Still another object of the invention is to provide improved microwave testing equipment for successively testing a microwave transmitter and its associated receiver, which equipment is contained in a unitary structure and may be easily switched from one mode of operation to the other.

For a more complete understanding of the invention, reference is now made to the detailed description of a preferred embodiment of the invention and to the accompanying drawings, in which:

FIG. 1 is a block diagram showing the arrangement of the components used in a working embodiment of the invention to test a microwave system radiating circularly polarized waves, the figure also illustrating mechanical means for holding the testing apparatus in position in the field of the microwave system being tested;

FIG. 2 is a perspective view, partially cut away and partially in phantom, showing the working elements of the microwave switch assembly generally shown in FIG. 1, the switch being positioned so that transmitter power may be measured;

FIG. 2A is a perspective view of the microwave switch shown in FIG. 2 below the plane marked 2A, the switch being positioned so that receiver sensitivity may be measured;

FIG. 3 is a perspective view of the turnstyle section of the microwave switch shown in FIG. 2 and FIG. 2A; and FIG. 4 is a schematic drawing showing the principle of operation of the turnstyle section of the microwave switch shown in FIG. 2 and FIG. 2A.

Before discussing the drawings in any detail it will be noted that the illustrated microwave system has only one beam even though in fact three or four beams may actually be used in equipment such as doppler radar. It should be obvious, however, that the number of beams in the equipment to be tested is not essential to the operation of the invention so long as the equipment uses a common system antenna for transmitting and receiving. Further, it should be noted that the particular equipment here shown being tested uses circularly polarized microwave radiation, although again such a restriction is not essential.

The illustrated testing apparatus includes an anechoic chamber 11 having any known microwave energy absorbing material 13 fitted around its sides and its bottom. The top of each side of the anechoic chamber 11 preferably is shaped so as to match the outside of a radome 15 fitted into an aircraft fuselage 17. While the dimensions of the anechoic chamber 11 are not critical, it will be appreciated that the dimensions do affect the amount of space attenuation suffered by the transmitted microwave. Projecting into the anechoic chamber 11 is a microwave horn 19, which element preferably is similar to the system antenna although it need not be. While any desired mechanical arrangement may be made to hold the microwave horn 19 firmly in place in the anechoic chamber 11.

here a jack assembly 20 (to be described hereinafter) is provided to ensure rapid and unique positioning of the anechoic chamber 11 with respect to the antenna 21 of the microwave system under test. The jack assembly 20 consists simply of a scissors jack 23 mounted on a dolly 25. A negator spring 26, biased so that it tends always to decrease its length, is stretched between a pivot point 27 at any two adjacent legs of the scissors jack 23 and a takeup spool, or cylinder 29, as illustrated. The upper end of the scissors jack 23 preferably is pivotably attached to the anechoic chamber 11. When the dolly 25 is positioned under the radome 15 and upward movement of the scissors jack 23 is initiated, the negator spring 26 forces the scissors jack 23 to keep opening until the anechoic chamber 11 is seated on the radome 15. The negator spring 26 subsequently maintains the scissors jack 23 in its extended position so that the anechoic chamber 11 remains seated on the radome 15 regardless of changes in the attitude of the aircraft.

A circular waveguide 31a is attached to the microwave horn 19 to conduct such energy as is received by the microwave horn 19 to a quarter wave plate 33. The quarter wave plate 33, which may be of any known construction, but here is made up of two parallel wires 33a, 33b, spaced at a distance equal to three eighths of the wavelength of the wave in the guide, converts the circular polarization of the energy received by the horn 19 to a plane polarized wave having its plane of polarization at an angle of 45° to the plane defined by the wires. The plane polarized wave is led, through a second section 31b of circular waveguide to a known Faraday rotator 35 so that the plane of polarization of the wave is rotated another 45°. Again, although any known non-reciprocal Faraday rotator may be used, in the illustrated embodiment the Faraday rotator consists of a tapered ferrite rod 35a coaxially supported in a ring 35b of a material having a low dielectric constant, as styrofoam. A permanent magnet (not shown) of proper polarity and strength biases the ferrite rod 35a. The wave is then led through a third section 31c of the waveguide 31 to a variable attenuator 37. The elements of the latter assembly which cooperate to attenuate the microwave energy are a fixed attenuator card 37a and a movable attenuator card 37b. Each card is fabricated from a material having a dielectric constant much higher than that of air and is notched as shown to avoid discontinuities in the path of the microwave energy. The fixed attenuator card is set in slots (not shown) in the inner wall of the third section 31c so as to be in the plane defined by the wires 33a, 33b. The movable attenuator card 37b is also mounted in slots (not shown) in a section 31d of waveguide which butts the lower end of section 31d in any known manner to avoid a discontinuity in the path of the energy passing through the waveguide. Rotation of the movable attenuator card 37b may be accomplished through a mechanical gear assembly such as that illustrated. That is, a cover 40 (shown in phantom in FIG. 2) is attached to the outside of section 31c in any desired manner. A bevel gear 42 is supported on a shaft 44 projecting through a wall of the cover 40 so as to mate with a ring gear 46 attached to the outer wall of section 31d. Thus, when shaft 44 is rotated, as by rotating a knob 48, the motion is transmitted through the gear assembly to rotate the movable attenuator card 37b with respect to the fixed attenuator card 37a.

Affixed to and depending from the section 31d is a microwave switch 49. This element preferably is a turnstyle switch illustrated in detail in FIGS. 3 and 4, although other kinds of switches may be used. In the illustrated case the turnstyle switch comprises a junction 51 having a circular port 51a and four rectangular ports 51b, 51c, 51d and 51e, orthogonal to the plane of the circular port 51a and spaced at 90° intervals about the axis of the circular port 51a. In addition, the rectangular ports 51b, 51c, 51d and 51e are fixed in either one of two positions with respect to the movable attenuator card 37b. This is accomplished by attaching a flange 53 to the junction 51 and mating the flange 53 with a matching flange 55 attached to the waveguide section 31d. A known detent mechanism (not shown) having two holding positions then serves to hold the flanges 53, 55 in either of the two holding positions with respect to each other. Consequently, the elements rigidly attached to flange 55 (in particular, the movable attenuator card 37b) and the elements associated with flange 53 (in particular, the rectangular ports 51b, 51c, 51d and 51e) assume one of two angular positions with respect to each other. To complete the junction 51, a known matching post assembly 57 is disposed as shown and rectangular waveguide sections 60b, 60c, 60d and 60e are attached to respective ones of the rectangular ports 51b, 51c, 51d and 51e. Waveguide section 60c and 60e are terminated respectively in short circuits 62c and 62e so disposed that the length of section 60c is one-eighth of a wavelength shorter than the length of section 60e. In consequence mechanical rotation of the flange 53 between its two positions causes the microwave energy incident on the junction 51 through the circular port 51a to be switched to either of the rectagular ports 51b, 51d.

Consideration of the scattering matrix [s] of a turnstyle junction under matched conditions and having symmetrical reference planes (as indicated by the broken lines in FIG. 4) will make clear the reason why microwave energy may be switched between rectangular ports 51b and 51d during operation. Thus, as shown in FIG. 4, if the short circuit 62c is placed in rectangular guide 60c at a distance corresponding to $\theta_1$ electrical radians from a reference plane "A" intersecting the axis waveguide and the short circuit 62e is placed in waveguide 60e at a distance corresponding to $\theta_2$ electrical radians from its reference plane "B" so that $$\theta_1 = \theta_2 + \frac{\pi}{2}$$

a four port device is formed having a scattering matrix (1) $$[s] = \frac{1}{\sqrt{2}} = \begin{vmatrix} 0 & 0 & 1 & -e^{j2\theta} \\ 0 & 0 & -1 & -e^{j2\theta} \\ 1 & -1 & 0 & 0 \\ -e^{j2\theta_1} & -e^{j2\theta_1} & 0 & 0 \end{vmatrix}$$

if then $\theta_2$ is made equal to $\pi/2$, the scattering matrix reduces to:

(2) $$[s] = \frac{1}{\sqrt{2}} = \begin{vmatrix} 0 & 0 & 1 & 1 \\ 0 & 0 & -1 & 1 \\ 1 & -1 & 0 & 0 \\ 1 & 1 & 0 & 0 \end{vmatrix}$$

if a linearly polarized wave $a$ is fed through the circular port 86, the plane of polarization of such a wave making an angle $\phi$ with respect to the reference plane intersecting guide 60c then (3) $$\vec{a} = \begin{vmatrix} 0 \\ 0 \\ a \cos \phi \\ a \sin \phi \end{vmatrix}$$

and the outputs $\vec{b}$ (through ports 51b, 51d) equal (4) $$\vec{b} = \frac{1}{\sqrt{2}} \begin{vmatrix} a \cos \phi + a \sin \phi \\ -a \cos \phi + a \sin \phi \\ 0 \\ 0 \end{vmatrix}$$

That is, through port 51b (5) $$b_{51b} = \frac{a}{\sqrt{2}}(\cos \phi + \sin \phi)$$

and through port 51d (6) $$b_{51d} = \frac{a}{\sqrt{2}}(-\cos \phi + \sin \phi)$$

Consequently, when $\phi = \pi/4$ (7)
$$b_{51b} = a$$
$$b_{51d} = 0$$

and when $\phi = \frac{3}{4}\pi$ (8)
$$b_{51b} = 0$$
$$b_{51d} = a$$

The end of waveguide section 60b removed from the junction 51 is connected to a power measuring device, as a bolometer 61, while the end of the waveguide section 60d removed from the junction 51 is connected to a movable short circuit plate 63. Thus, when $\phi$ is set to equal $\pi/4$, all the microwave energy entering the junction 51 through the circular port 51a is switched through port 51b to the bolometer 61 and when $\phi$ is set to equal $\frac{3}{4}\pi$ all the microwave energy entering through the circular port 51a is switched through port 51d to be reflected by the movable short circuit plate 63 and redirected back through the junction 51 into waveguide section 31d and led back through that guide to emerge from horn 19 with circular polarization of an opposite sense to the wave transmitted by the system antenna.

It will be obvious to those having skill in the art that when it is desired to measure power, the fixed attenuator card 37a and the movable attenuator card 71b will preferably be set parallel to each other (and consequently perpendicular to the plane of polarization of the incident wave) so that neither will affect the amplitude of the incident wave. It will be recognized, however, that a different situation exists when it is desired to measure receiver sensitivity.

In view of the fact that no perfect microwave absorbing material is known and that leakages and mismatches in any practical microwave transmission circuit must exist, it is evident that randomly reflected waves will impinge upon the system antenna and cause inaccuracies in measurement of receiver sensitivity. While it is impossible to predict the amplitude or phase of the individual ones of the so reflected waves, it will be appreciated that, at any instant in time, the waves reflected in any given arrangement of elements combine to form a resultant wave. If, then, a compensating wave of equal amplitude but opposite in phase to such a resultant wave is fed into the system antenna along with the resultant wave, the effect of the reflected wave will be cancelled. Further, if the amplitude of the compensating wave is increased a known amount beyond that required to cancel the effect of the resultant reflected wave, then a standard signal may be fed into the receiver under test. In the illustrated case the foregoing adjustments may be easily made even though the amplitude and phase of the resultant reflected wave is not known, by adjusting the position of the movable attenuator card 37b and the position of the movable short circuit place 63 until there is a null detected in the output of the receiver being tested and then moving the movable attenuator card 37b an amount, which may be determined analytically if desired, so as to decrease the attenuation of the wave out of horn 19. The net effect of this procedure is substantially to cancel out the effect on the receiver of any stray reflections and to provide a signal of known strength to test receiver sensitivity.

It will be apparent that there are many modifications to the invention which may be made without departing from the inventive concepts. For example, if it is desired to use the turnstyle junction as a power divider rather than as a switch, it is necessary merely to omit the dent mechanism so as to allow a continuous variation in the angle $\phi$, thereby dividing the power between the two output arms of the junction. It will also be evident that if the system being tested uses plane polarized waves rather than circularly polarized waves, the quarter wave plate and the Faraday rotator may be eliminated. In view of the foregoing noted modifications and others which have been noted hereinbefore it is evident that the invention should not be restricted by the description thereof but rather should be limited only by the spirit and scope of the appended claims.

What is claimed is:

1. Apparatus for successively testing the transmitter section and the receiver section of a microwave transmitting-receiving system having a common system antenna, comprising, an anechoic chamber, means for mounting the anechoic chamber adjacent to the system antenna to intercept the microwave energy radiated therefrom, a sampling antenna affixed to the anechoic chamber to receive a predetermined portion of the microwave energy in the anechoic chamber, a turnstyle junction including an input waveguide and first and second output waveguides, a coupling waveguide connecting the input waveguide of the turnstyle junction to the sampling antenna, adjustable attenuating means disposed in the coupling waveguide, means for sequentially orienting the first and the second output waveguides with respect to the input waveguide successively to switch the microwave energy in the input waveguide between the first and the second output waveguides, a power measuring device in circuit with the first output waveguide to provide an indication proportional to the microwave power radiated by the system antenna and reflecting means movably mounted in the second output waveguide to redirect the energy impinging thereon back through the turnstyle junction, the waveguide means, the sampling antenna and the anechoic chamber to the system antenna to present, to the receiver section of the microwave transmitting-receiving system, a microwave signal of known strength and phase for measuring the sensitivity of such section.

2. Apparatus as in claim 1 wherein the adjustable attenuator includes a quarter wave plate, a ferrite rotator and an adjustable rotator disposed in the coupling waveguide sequentially from the sampling antenna to produce a linearly polarized, variable amplitude, wave of microwave energy.

3. Apparatus as in claim 1 wherein the turnstyle junction comprises a section of circular waveguide rotatably mounted on the coupling waveguide and the first and the second output waveguide are each a section of rectangular waveguide orthogonal to the axis of the section of circular waveguide and on opposite sides thereof, the axis of the first output waveguide initially being set at an angle of 45° to the plane of polarization of the microwave energy in the circular waveguide and the means for sequentially orienting the first and second output waveguide includes means for rotating the circular section and the first and the second section 90°.

4. Apparatus for providing a microwave signal for testing the sensitivity of the receiver in a microwave transmitting-receiving system, comprising:
 (a) a directional antenna disposed in the radiation field of the transmitter of the system being tested;
 (b) phase-shifting and attenuating means connected to such antenna to adjust the phase and amplitude of the microwave energy received thereby;
 (c) reflecting means for redirecting the so-adjusted microwave energy back through the phase-shifting and attenuating means to the directional antenna for transmission back to the system being tested;
 (d) detecting means energized by the output of the receiver of the system being tested first to determine when the phase-shifting and attenuating means are adjusted substantially to cancel the effect of microwave energy reflected from other targets in the radiation field of the transmitter and then to measure the amplitude of the output of such receiver after the attenuating means has been again adjusted to increase, by a predetermined amount, the level of the microwave energy from the directional antenna.

5. Apparatus as in claim 4 having, additionally:
(a) means for measuring the power level of the microwave energy applied to the input of the receiver under test, including,
  (1) A bolometer, and,
  (2) a microwave switch connected to the output of the phase-shifting and attenuating means and adapted to switch the microwave energy passing therethrough from the directional antenna between the reflecting means and the bolometer.

6. Apparatus as in claim 5 having, additionally:
(a) means, including an anechoic chamber encompassing the antenna of the system being tested and the directional antenna, to minimize the effect of microwave energy reflected from other targets in the radiation field of the transmitter.

References Cited by the Examiner

UNITED STATES PATENTS

| | | | |
|---|---|---|---|
| 2,516,060 | 7/1950 | Levenson. | |
| 2,549,385 | 4/1951 | Rapuano | 324—95 |
| 2,656,533 | 10/1953 | London et al. | 345—17.7 |
| 2,885,677 | 5/1959 | Zaleski | 333—7 X |
| 2,941,166 | 6/1960 | Meyer | 333—7 X |
| 2,942,257 | 6/1960 | Huntington | 343—17.7 |
| 2,980,869 | 4/1961 | Rolfs | 333—7 |
| 2,985,850 | 5/1961 | Crawford | 333—7 |
| 2,988,740 | 6/1961 | Albanese | 324—58 X |
| 3,035,229 | 5/1962 | Guderian et al. | 343—17.7 X |

FOREIGN PATENTS 691,570   5/1953   Great Britain.

OTHER REFERENCES

"A Radar Test Set for the Super-High Frequency Band of 9000–9700 mc./s," article in Proc. of the Institute of Elect. Engr.; volume 96, part III, November, 1949, pages 476–482.

WALTER L. CARLSON, *Primary Examiner.*